United States Patent [19]
Yen et al.

[11] Patent Number: 5,770,167
[45] Date of Patent: Jun. 23, 1998

[54] WASTE GAS TREATING APPARATUS

[76] Inventors: Chin-Ching Yen, 2 F, No. 499, Ying-Tsai Road, Taichung, Taiwan; Chih-Ming Lee, 3 F, No. 92, Min-Chuan First Road, Kaohsiung, Taiwan

[21] Appl. No.: 761,001

[22] Filed: Dec. 5, 1996

[51] Int. Cl.⁶ .............................. B01D 50/00; B01D 47/00
[52] U.S. Cl. ........................... 422/172; 422/177; 261/21; 261/22
[58] Field of Search ..................................... 422/177, 172, 422/170; 423/243.08; 261/21, 22; 55/220

[56] References Cited

U.S. PATENT DOCUMENTS

| | | | |
|---|---|---|---|
| 3,880,597 | 4/1975 | GoldSchmidt et al. | 422/170 |
| 4,312,646 | 1/1982 | Fattinger et al. | 55/218 |
| 4,515,754 | 5/1985 | Stehning | 422/168 |
| 4,521,117 | 6/1985 | Ouwerkerk et al. | 366/165 |
| 4,539,184 | 9/1985 | Stehning | 422/170 |
| 4,860,670 | 8/1989 | Jorgensen | 110/215 |
| 4,931,263 | 6/1990 | Wakui et al. | 423/215.5 |
| 5,120,518 | 6/1992 | Yanagioka et al. | 423/242 |

*Primary Examiner*—Nina Bhat
*Attorney, Agent, or Firm*—Morton J. Rosenberg; David I. Klein; Jun Y. Lee

[57] ABSTRACT

This invention relates to a waste gas treating apparatus, especially for treating a waste gas containing sulfur dioxide and carbon dioxide. It includes at least one washing tower. At least one fluid inlet is disposed on a lateral wall of the washing tower, so that a fluid is pumped into the washing tower by constant amount and drained out from a draining opening of a base of the washing tower. At least one gas inlet is disposed on the wall of the washing tower below the fluid inlet. The waste gas is injected into the washing tower so as to contact with the fluid and form bubbles which buoy upward to a top of the washing tower and are exhausted from a gas outlet thereof. The fluid serves to react with and absorb the pollutants contained in the waste gas. The products of the reaction are discharged out of the washing tower along with the fluid.

2 Claims, 4 Drawing Sheets

WASTE GAS TREATING APPARATUS

BACKGROUND OF THE INVENTION

The present invention relates to a waste gas treating apparatus which employs a fluid to contact with the waste gas for reacting with and absorbing the pollutants contained in the waste gas.

In the industrial exhausted waste gases, sulfur dioxide and carbon dioxide are the major factors affecting air quality and environment. Sulfur dioxide is a gas pollutant which exists in the air with greater amount and wider influence. It is mainly produced in the burning procedure of fossil fuel (coal or petroleum) and in the metallurgical or heating procedure of sulfide mineral. The fire power plant, metal metallurgical factory, oil refinery and all other industrial burner and furnaces burning coal or oil will exhaust sulfur dioxide gas. The sulfur dioxide in the air will be solved by water into sulfuric acid solution. This acid solution will not only lead to direct breathing injury of human body, but also corrode buildings and agricultural plants. On the other hand, carbon dioxide is a pollutant which is produced with greatest amount among various kinds of gas pollutants. It mainly results from fuel combustion. In the case of excessively high concentration of carbon dioxide in the air, the concentration of oxygen will be relatively reduced. This will cause bad influence on human body. The increment of concentration of carbon dioxide on the earth leads to greenhouse effect which makes the temperature gradually increase globally and changes the biological system and climate abnormally. Therefore, that how to solve the problems caused by the aforesaid two gas pollutants becomes a serious issue.

In many countries of the world, high chimneys are adopted to dissipate the gas pollutants to a higher and wider area so as to reduce air pollution in local districts. However, such high chimney policy can only relieve local air pollution, while the total amount of the exhausted pollutants is not reduced. Moreover, the high chimneys are constructed at high cost, while no one can solve the problem of global environment pollution.

SUMMARY OF THE INVENTION

In order to solve the above-mentioned problems, it is a primary object of the present invention to provide a waste gas treating apparatus which is able to effectively purify a great amount of industrial gas pollutants including sulfur dioxide and carbon dioxide. The purified gas can be directly exhausted into the atmosphere. Therefore, the acid rain and greenhouse effect caused by the above pollutants can be minimized.

To achieve the above object, the waste gas treating apparatus of the present invention includes at least one washing tower. At least one fluid inlet is disposed on a lateral wall of the washing tower. A fluid added with lime is pumped into the washing tower by constant amount and drained out from a draining opening of a base of the washing tower into a precipitation pool. The level of the fluid in the washing tower is maintained at a predetermined height above the fluid inlet. At least one gas inlet is disposed on the wall of the washing tower below the fluid inlet. The waste gas is injected into the washing tower so as to contact with the fluid and form bubbles which buoy upward to a top of the washing tower and are exhausted from a gas outlet thereof. The fluid serves to react with and absorb the pollutants contained in the waste gas. The products of the reaction are discharged out of the washing tower along with the fluid into the precipitation pool.

The present invention can be best understood through the following description and accompanying drawing, wherein:

DETAILED DESCRIPTION OF THE PREFERRED EMBODIMENTS

Figure 1:
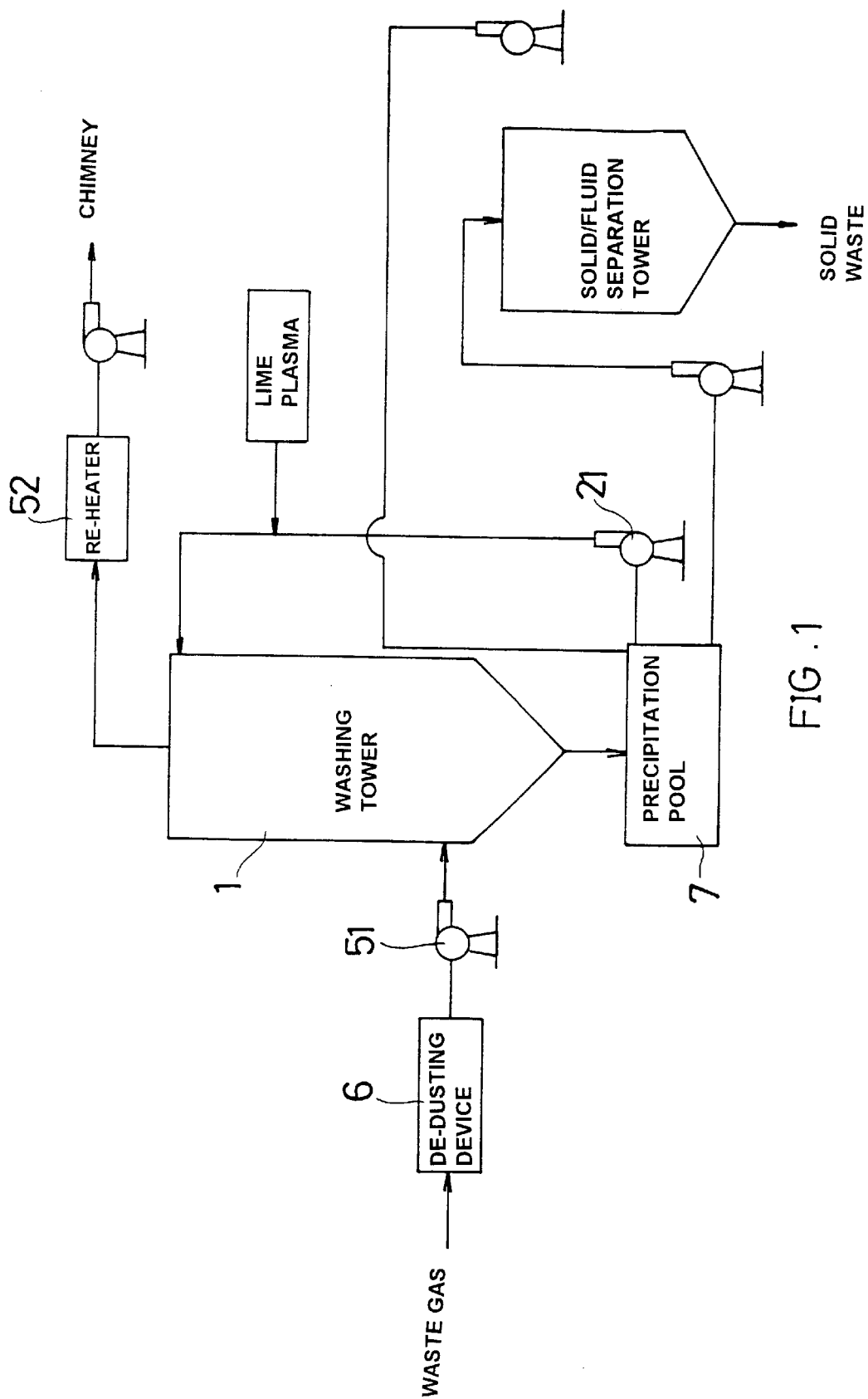
FIG. 1 is a flow chart of the waste gas treating procedure of the present invention.
Figure 2:
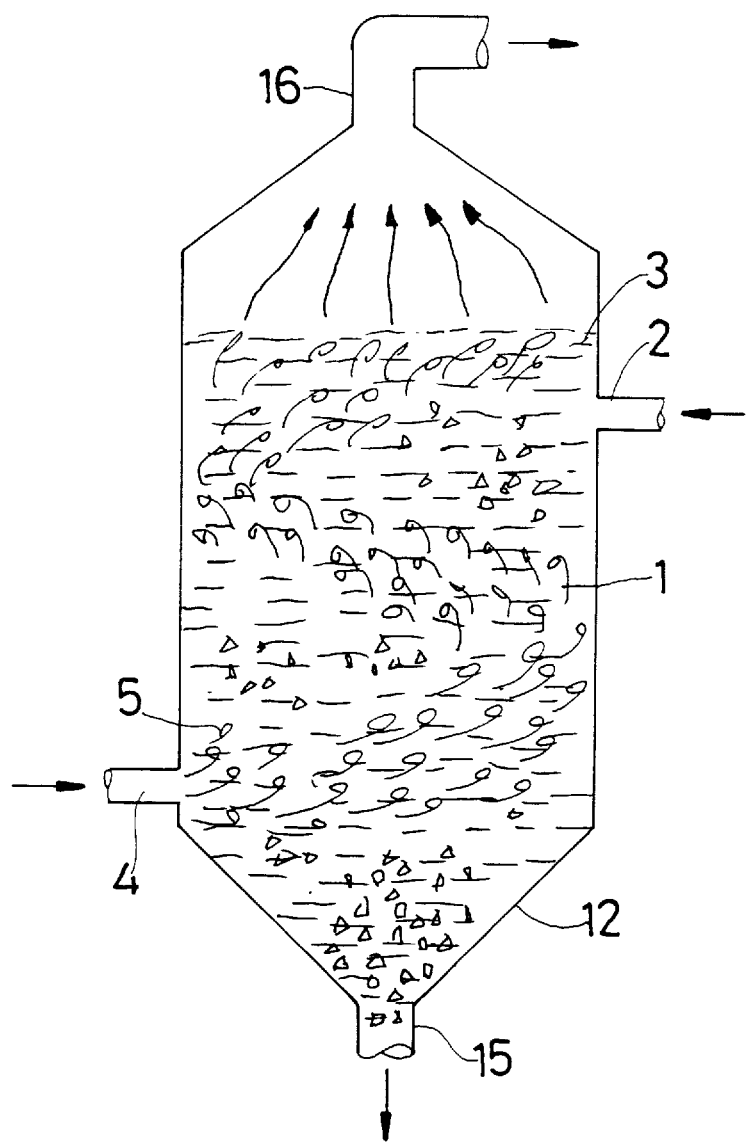
FIG. 2 is a longitudinal sectional view of a first embodiment of the present invention, showing the structural arrangement of the washing tower thereof.

Please refer to FIGS. 1 and 2. According to a first embodiment of the present invention, the waste gas treating apparatus includes a substantially cylindrical washing tower 1 having a conic base 12. A fluid inlet 2 is disposed on a lateral wall of the washing tower 1, whereby a fluid 3 can be pumped into the washing tower 1 at a pre-determined height by constant amount via a pump 21. A control device (not shown) is used to maintain the level of the fluid in the washing tower 1 at a predetermined height above the fluid inlet 2 and make the fluid at the base of the washing tower 1 continuously flow out from a draining opening 15 by a constant amount.

A gas inlet 4 is disposed on the washing tower below the fluid inlet 2, whereby the waste gas 5 is injected into the washing tower by a constant amount via a gas compressor 51 so as to form bubbles which impact the fluid 3 to create fine bubbles. The bubbles buoy upward to the top of the washing tower 1 and are exhausted from a gas outlet 16 thereof.

In this embodiment, a de-dusting device 6 is disposed in front of the gas inlet 4 for previously removing the ashes occupying over 95% of the waste gas prior to entrance of the waste gas.

In this embodiment, the fluid 3 is added with lime to form an alkaline lime plasma. The optimal operative pH value is about 8. The waste gas containing carbon dioxide is injected into the fluid 3 from the gas inlet 4 at high pressure to form bubbles which impact the fluid 3 to create more smaller bubbles. Therefore, the interface area for the fluid 3 to absorb carbon dioxide is increased. The absorbed carbon dioxide reacts with the alkaline plasma to form calcium carbonate. The calcium ion in the fluid is continuously consumed in the reaction so that it is necessary to frequently supplement the fluid 3 with lime for maintaining a certain concentration of the calcium ion therein.

The product of calcium carbonate is discharged along with the fluid 3 from the draining opening 15 into a precipitation pool 7. The calcium carbonate will precipitate onto the bottom of the pool to be collectively treated. The fluid 3 is pumped by the pump 21 (which is disposed on a lower portion of the precipitation pool 7) again into the washing tower 1 for re-circulative use.

After washed, the gas will contain only little carbon dioxide and it can be further conducted into another washing tower with the same lime plasma until the carbon dioxide totally reacts therewith and becomes calcium carbonate precipitation. At this time, the gas can be heated by a re-heater 52 and exhausted to the atmosphere through the chimney.

With respect to treatment of waste gas containing sulfur dioxide, the alkaline lime plasma can be further added with adipic acid as a buffer agent. Adipic acid pertains to dicarboxylic acid including six carbons, which serves to buffer pH value in the plasma. Because adipic acid is available from wide sources and has a low price, this is the reason why adipic acid is chosen.

The aforesaid alkaline lime plasma is able to remove over about 95% of sulfur dioxide in the waste gas. The alkaline lime plasma without adipic acid only has a utility ratio within 65 to 70%. After adding adipic acid thereinto, the plasma can have an increased utility ratio up to over 80% for more effectively removing sulfur dioxide.

Adipic acid creates such a buffer effect as to suppress the decrement of pH value caused by solution of sulfur dioxide on the gas/fluid interface. Therefore, the concentration of sulfur dioxide on the fluid level is increased to enhance the reaction ability of the fluid with sulfur dioxide. Before the fluid 3 is injected into the washing tower 1, adipic acid reacts with the lime to form calcium adipate. After injected into the washing tower 1, calcium adipate reacts with the absorbed sulfurous acid to form calcium sulfite and restore adipic acid which is discharged along with the fluid 3 from the draining opening 15 for re-circulative use.

The product of calcium sulfite is discharged along with the fluid 3 from the draining opening 15 into the precipitationpool 7. The calcium sulfite will precipitate onto the bottom of the pool for collective treatment. The upward fluid can be re-circulatively used.

After treated and washed, the gas only contains below 5% of sulfur dioxide (that is, over 95% of sulfur dioxide has been removed). The gas can be further conducted into another washing tower with the same lime plasma until the sulfur dioxide totally reacts therewith and becomes calcium sulfite precipitation. At this time, the gas can be heated by the re-heater 52 and exhausted to the atmosphere through the chimney, or it can be exhausted out directly.

It should be noted that the waste gas injected into the washing tower will form many bubbles which impact the fluid to create numerous fine bubbles. These fine bubbles serve to increase the contacting area of the fluid with the gas and the speed of this reaction. Moreover, the injected waste gas will force the fluid to flow so as to prevent the precipitation from attaching to and accumulating on the wall of the washing tower.

Figure 3:
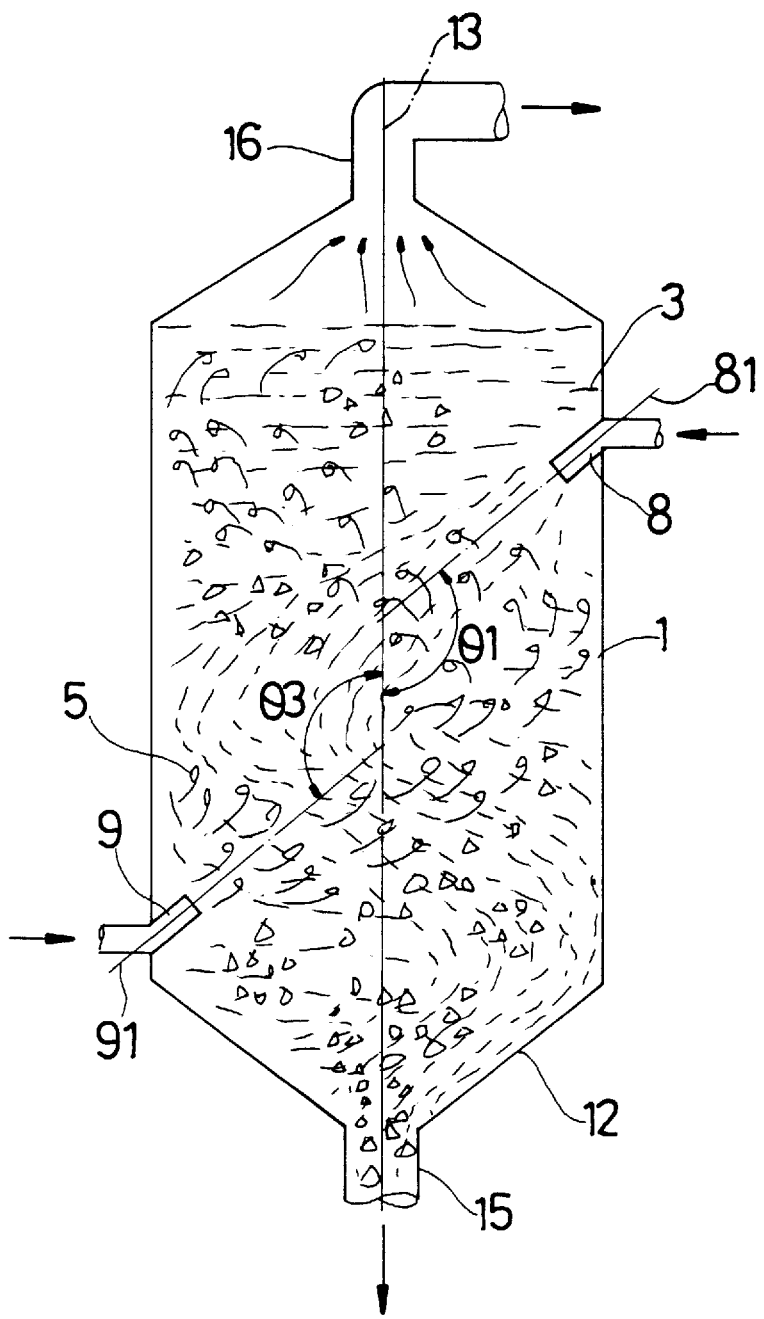
FIG. 3 is a longitudinal sectional view of a second embodiment of the present invention, showing the structural arrangement of the washing tower thereof, wherein the fluid inlets and gas inlets are inclinedly disposed on the wall of the washing tower opposite to each other.
Figure 4:
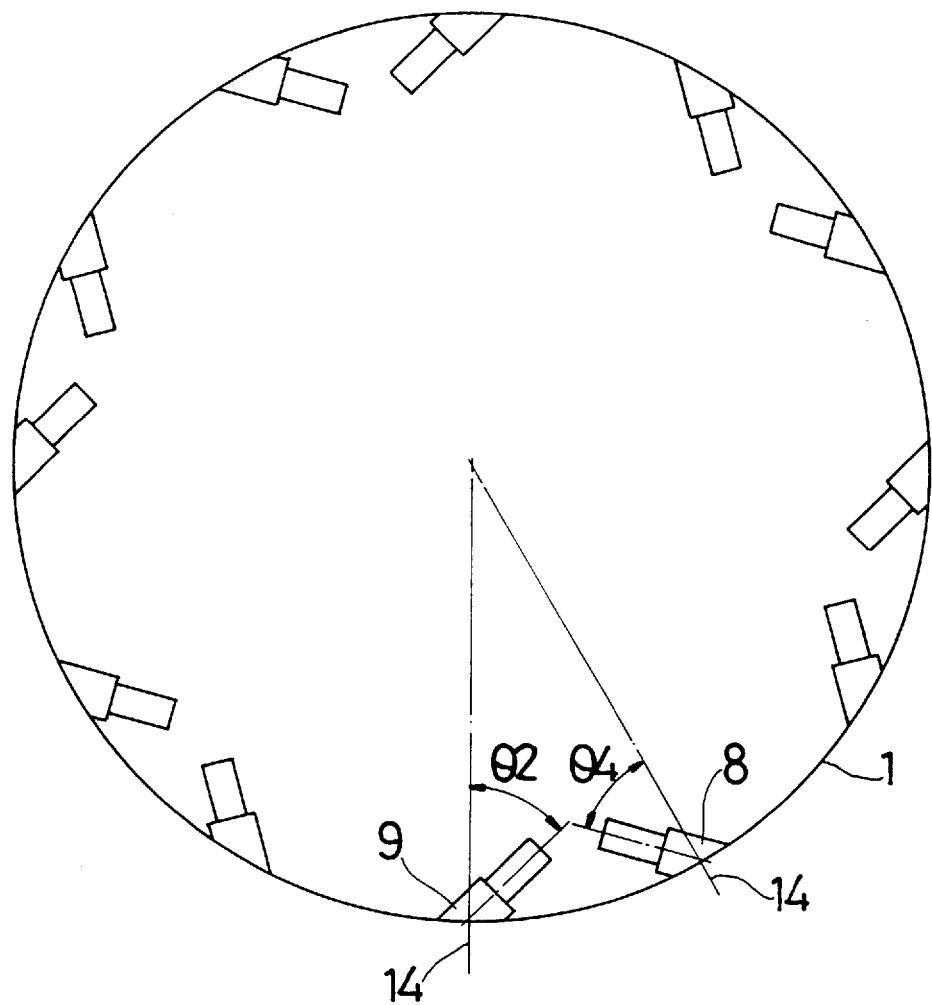
FIG. 4 is a cross-sectional view of the second embodiment of the present invention, showing that the fluid inlets and gas inlets are reversibly spirally disposed on the wall of the washing tower.

Please refer to FIGS. 3 and 4. In a second embodiment of the present invention, multiple fluid inlets 8 are clockwisely annularly arranged on inner wall of the washing tower 1 at equal intervals. In this embodiment, there are six fluid inlets 8 each having an axis 81 directed inclinedly downward to contain an angle $\theta_1$ with the axis 13 of the washing tower 1. The angle $\theta_1$ is preferably within 10 to 30 degrees. The axis 81 also contains an angle $\theta_2$ with the normal line 14 of the wall of the washing tower 1. The angle $\theta_2$ is preferably within 45 to 85 degrees. Accordingly, the fluid 3 can be injected into the washing tower 1 by constant amount via a compressor to form an eddy or an swirl.

Multiple gas inlets 9 are counterclockwisely annularly arranged on inner wall of the washing tower 1 at equal intervals below the fluid inlets 8. In this embodiment, there are also six gas inlets 9 each having an axis 91 directed inclinedly upward to contain an angle $\theta_3$ with the axis 13 of the washing tower 1. The angle $\theta_3$ is preferably within 10 to 30 degrees. The axis 91 also contains an angle $\theta_4$ with the normal line 14 of the wall of the washing tower 1. The angle $\theta_4$ is preferably within 45 to 85 degrees. Accordingly, the waste gas 5 can be injected into the fluid 3 by constant amount to form eddy bubbles which impact the fluid 3 to create numerous fine bubbles. The bubbles buoy upward to the top of the washing tower 1 and are exhausted from the gas outlet 16 thereof.

According to the arrangement of the second embodiment, the eddy fluid and bubbles serve to increase the disturbance and prolong reaction time so as to achieve a more effective treatment.

It is to be understood that the above description and drawings are only used for illustrating some embodiments of the present invention, not intended to limit the scope thereof. Any variation and derivation from the above description and drawings should be included in the scope of the present invention.

What is claimed is:

1. A waste gas treating apparatus for treating a waste gas containing at least one gas selected from the group consisting of carbon dioxide or sulfur dioxide, comprising:

at least one washing tower having a draining opening disposed in a base portion thereof;

a precipitation pool coupled in fluid communication with said draining opening;

a plurality of angularly arranged fluid inlets disposed at equal intervals on an inner wall of said washing tower, each of said plurality of fluid inlets being inclined downwardly at an angle within the approximating range of 10 to 30 degrees and inclined inwardly at an angle within the approximating range of 45 to 85 degrees with respect to a line extending normal to said inner wall of said washing tower for introducing a clockwise flow of a fluid passing therefrom;

means for supplying the fluid to said plurality of fluid inlets at a substantially equal and constant flow rate, said substantially constant flow rate of said plurality of fluid inlets being equal to a flow rate of the fluid through said draining opening for maintaining the fluid at a predetermined height above said plurality of fluid inlets, said fluid supply means including means for recirculating the fluid from said precipitation pool and means for forming a dispersion of lime in the fluid;

compressor means coupled in fluid communication with said washing tower and a source of the waste gas for supplying the waste gas to said washing tower at a predetermined pressure;

means for removing ashes from the waste gas disposed intermediate the source of the waste gas and said compressor means; and a plurality of angularly arranged gas inlets disposed at equal intervals on an inner wall of said washing tower at a height below said plurality of fluid inlets and coupled in fluid communication with said compressor means for injecting the waste gas into the fluid, the gas being injected at a substantially equal flow rate from each of said plurality of gas inlets, each of said plurality of gas inlets being inclined upwardly at an angle within the approximating range of 10 to 30 degrees and inclined inwardly at an angle within the approximating range of 45 to 85 degrees with respect to a line extending normal to said inner wall of said washing tower for introducing a counterclockwise flow of the waste gas passing therefrom.

2. The waste gas treating apparatus as recited in claim 1 where said means for forming a dispersion of lime includes means for adding adipic acid to the fluid as a buffer agent.

* * * * *